May 7, 1957 J. B. PLATNER ET AL 2,791,205
INTAKE MANIFOLD AND FUEL FEEDING SYSTEM
FOR HIGH OUTPUT ENGINES
Filed Aug. 10, 1953 5 Sheets-Sheet 1

INVENTORS.
John B. Platner.
Charles D. Moore.
BY
Harness & Harris
ATTORNEYS.

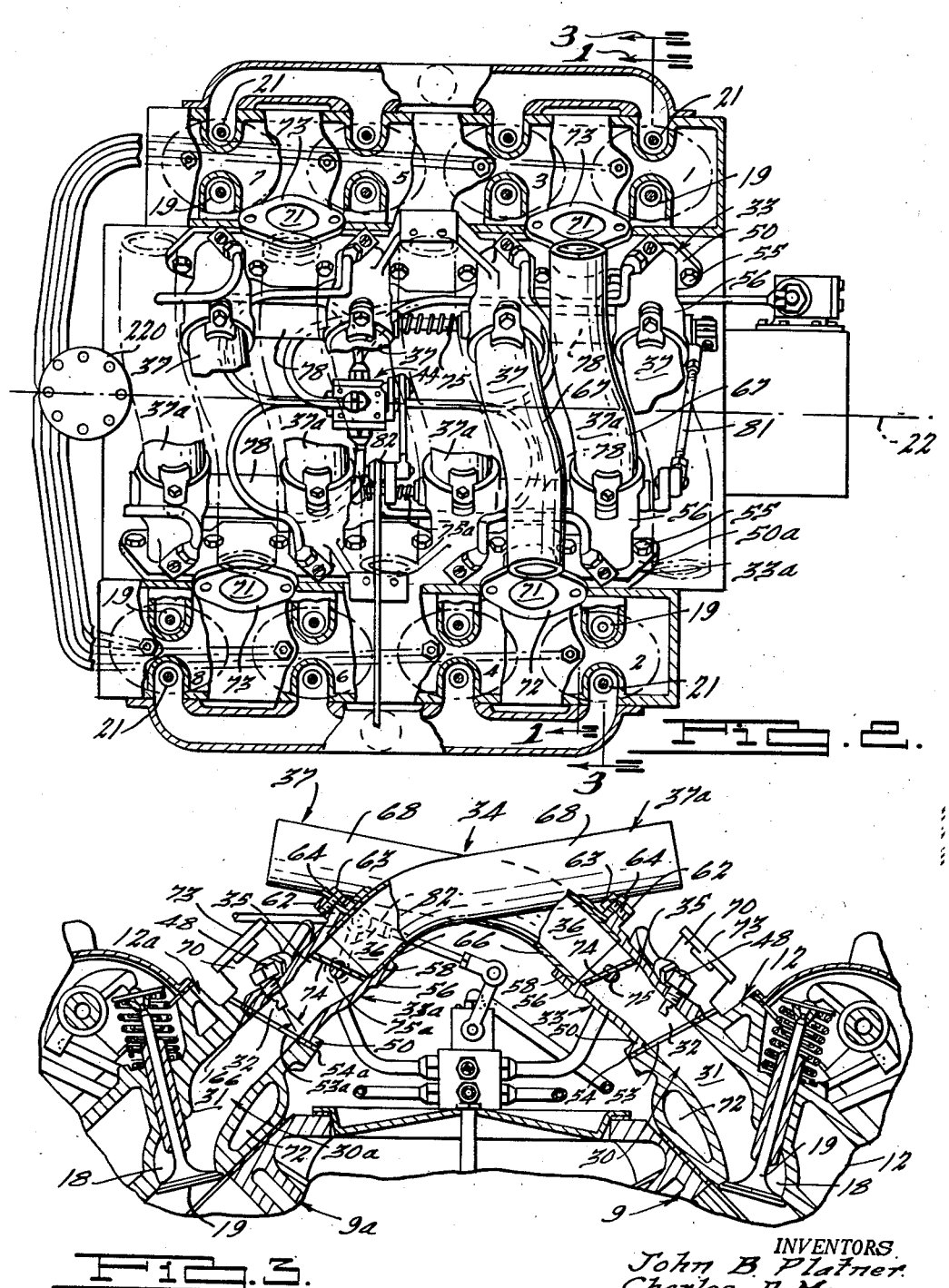

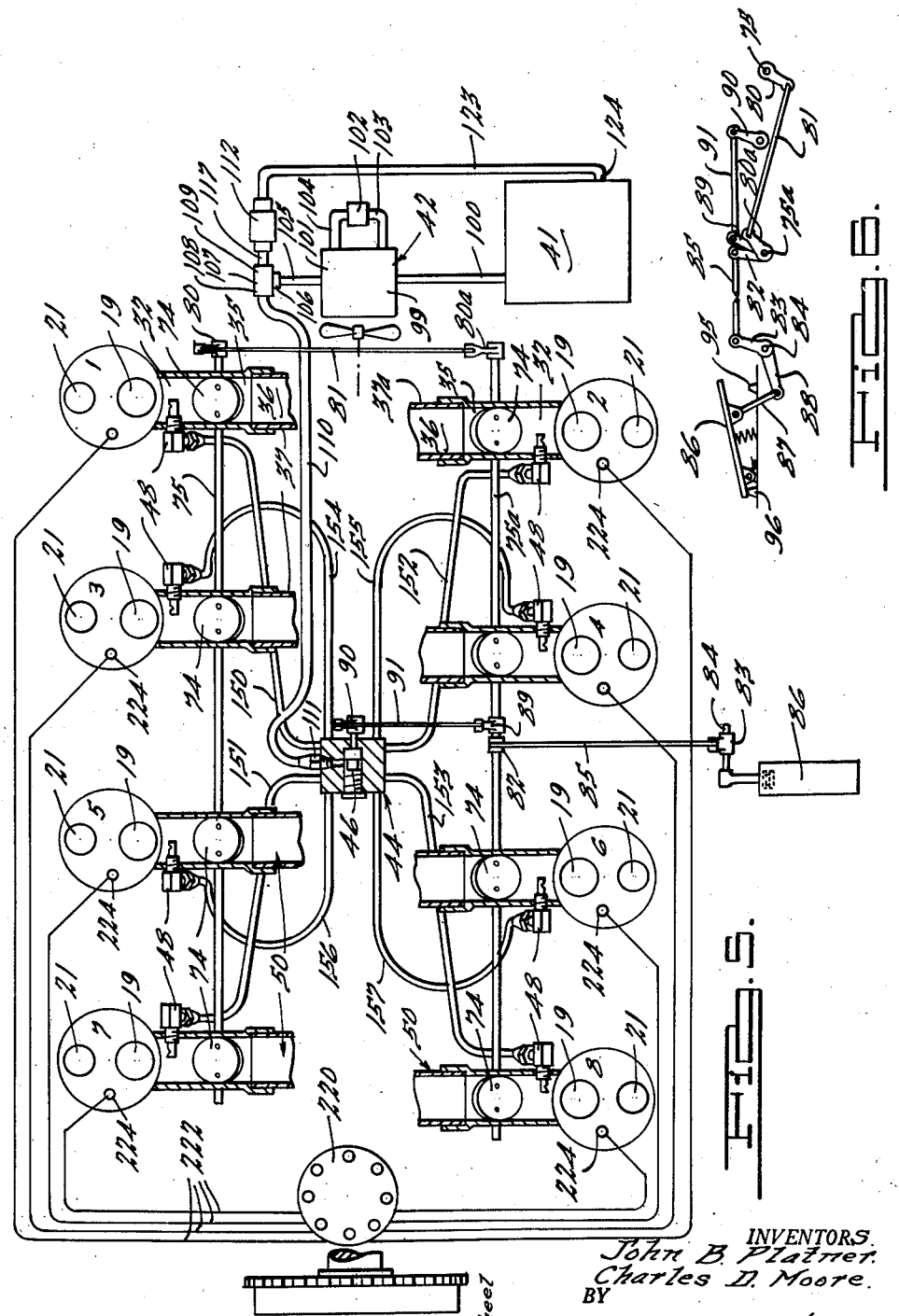

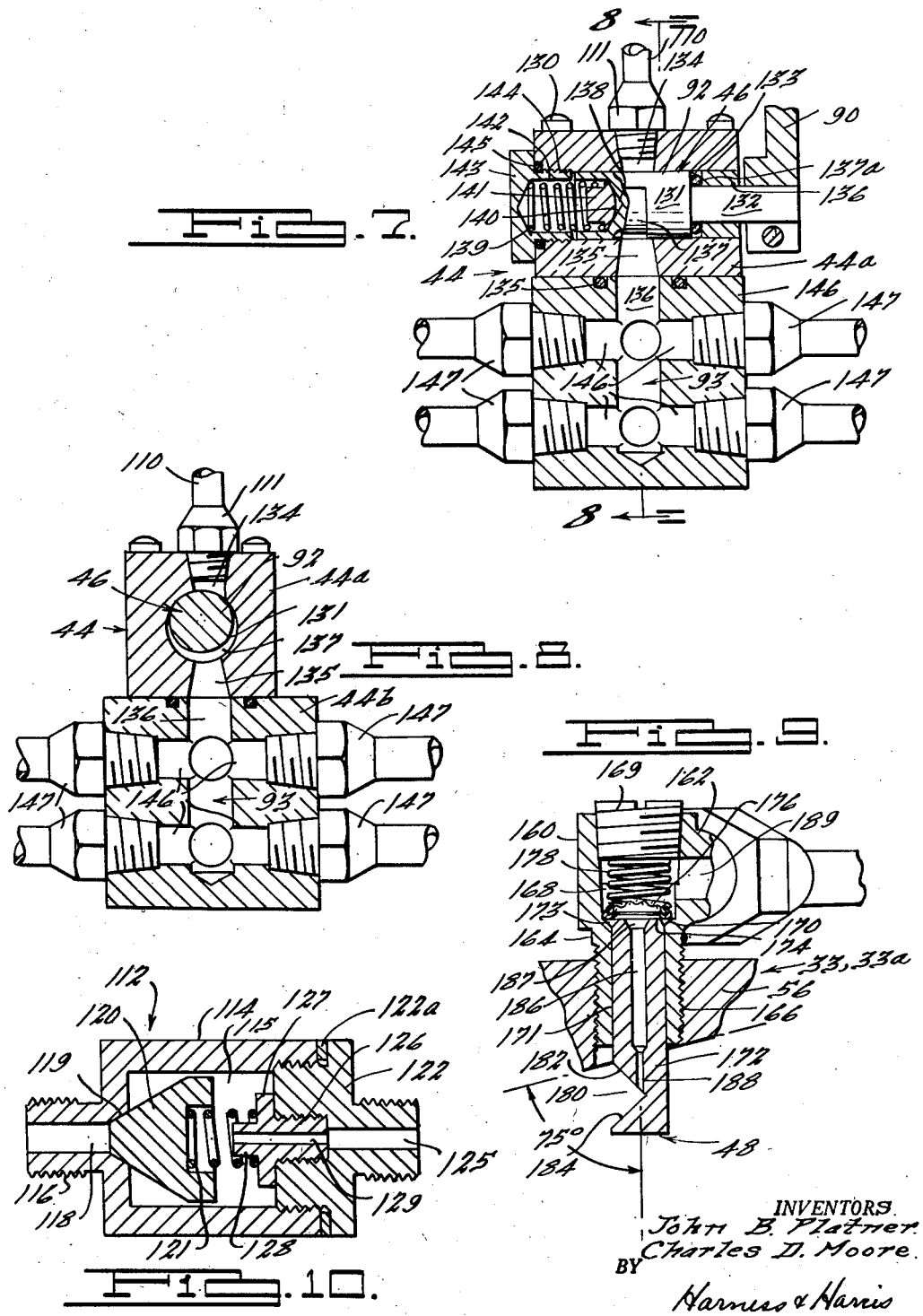

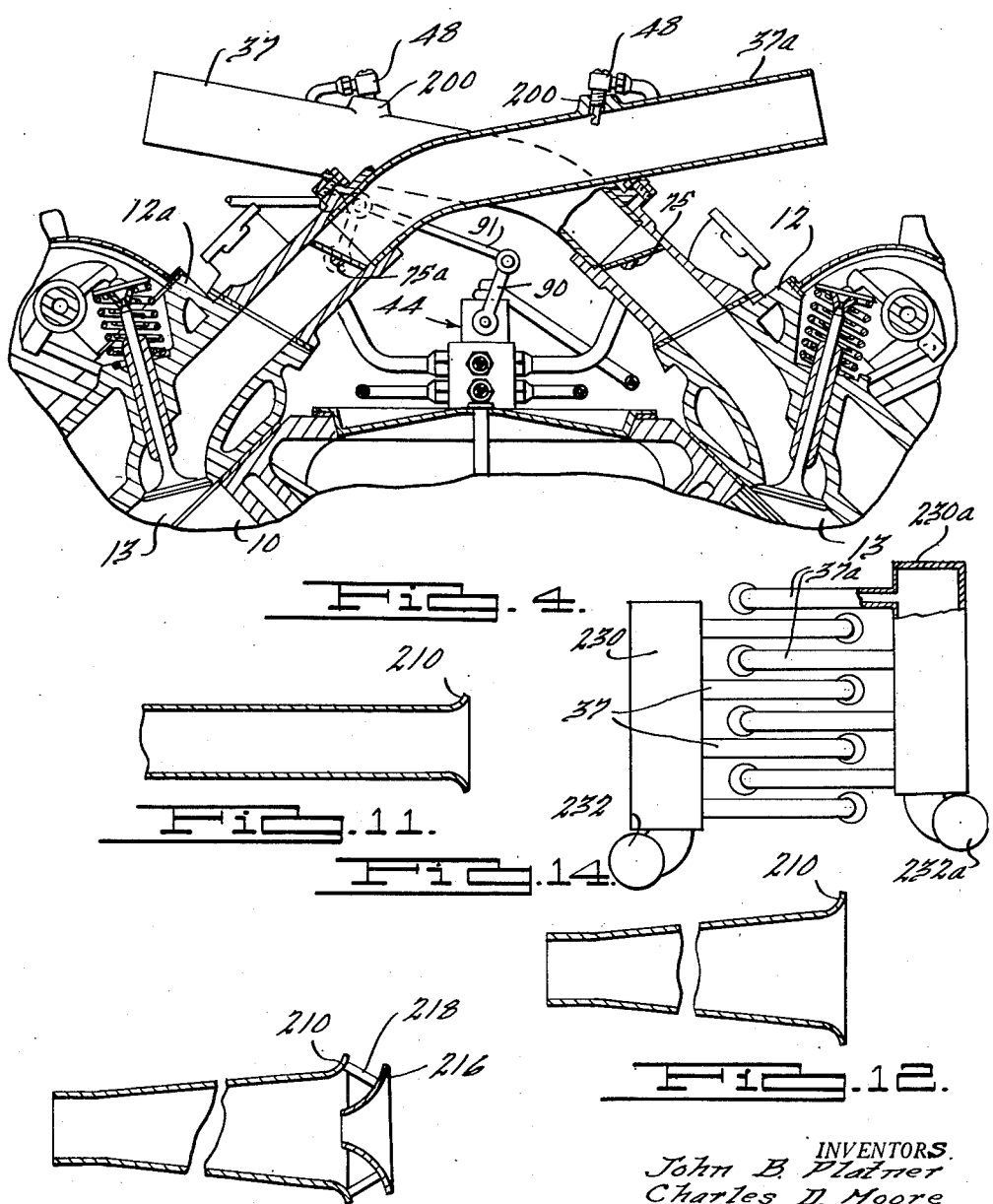

_United States Patent Office_

2,791,205
Patented May 7, 1957

2,791,205

INTAKE MANIFOLD AND FUEL FEEDING SYSTEM FOR HIGH OUTPUT ENGINES

John B. Platner, Detroit, and Charles D. Moore, Birmingham, Mich., assignors to Chrysler Corporation, Highland Park, Mich., a corporation of Delaware Application August 10, 1953, Serial No. 373,376

18 Claims. (Cl. 123—55)

This invention relates to high power output engines for driving motor vehicles. It especially relates to engines, particularly V-engines, having continuous fuel injection and that are provided with improved induction systems capable of characterizing such engines with extraordinary power performance. The present application is, as to certain features, a continuation-in-part of our copending application Serial No. 297,318 filed July 5, 1952.

Our invention will be described as applied to a V-8 engine of current manufacture having hemispherical combustion chambers, but it will be understood that the novel features of our invention are not limited thereto but are applicable to engines generally and engines of a greater or lesser number of cylinders, and are especially applicable to engines provided with individual induction systems for each cylinder and continuous fuel injection in such systems.

In the past it has been customary when seeking to increase the power and torque outputs of an automobile engine to increase the displacement or compression ratio.

Our experimentation with engines having carburetor and injection forms of fuel feeding has shown that the length of the intake system has a profound bearing on the power and/or torque output of an engine over certain operating ranges.

In our prior application aforesaid we described how dynamic charging or so-called ram of the cylinders of a carbureted engine contributes to higher power and torque outputs in the mid and high speed ranges and illustrated how this might be obtained by securing harmonic resonant tuning of the intake system.

We there showed that this was only possible if the intake system was of a proper length and provided an empirical formula:

$$L = 72 \frac{C}{N}$$

as the tool for determining approximately such length. As there shown L represented the stated passage length in inches from the air entrance of the intake system to the intake valve of the cylinder it feeds measured on the axes of the passages, ports, risers, etc. comprising the intake or inlet system, N was the engine speed in R. P. M. at which the engine output is to peak and C was the velocity of sound in feet per second in the intake passage under the particular temperature and pressure conditions expected therein.

It is the purpose of the present invention to apply this feature as well as further novel features to engines utilizing fuel injection as the source of fuel (solid, liquid or gaseous) and to especially combine therewith continuous intake fuel injection so as to substantially increase the peak torque and/or power output of such engines.

We have found that the aforesaid empirical formula is applicable to engines using fuel injection and gives within practicable limits the air intake passage system length essential for obtaining harmonic resonant tuning of the intake system of such an engine. In this connection, it will be undersood that no two engines have exactly the same operating characteristics. Moreover, the density of the air-fuel mixture in the air intake stream will vary with different fuels and location of the injection nozzle and the velocity of sound therein will accordingly also vary. However, the overall variations in the velocity of sound under any given set of conditions due to these differences are believed relatively small, usually less than 5%. Hence, where optimum peak power or torque is desired by those in the art, it is recommended that small variations from the calculated value for L be tried until the desired peak is obtained. We have found that decreases in length will usually increase the engine speed value at which resonance will occur and will show greatest peak power, whereas increases in length will show the greatest peak value for torque.

Accordingly, it is the principal object of our invention to provide piston type combustion engines with fuel injection feeding, and a dynamically charged induction system for improving its performance.

Another object is to provide engines with an induction or intake system into which fuel is continuously injected and which has harmonic resonant tuned air intake passages, for markedly increasing the power and torque outputs.

It is also an object to provide V engines with independent intake or induction systems for each cylinder and which systems have harmonic resonant tuning.

Another object is to provide an internal combustion engine with a pressurized air intake system into which fuel is continuously injected.

A further object of our invention is to provide an induction system for increasing the peak power and torque outputs of currently-made V-8 engines having hemispherical combustion chambers without need for making major design changes in such engines and whereby the horsepower output of such engines may be markedly increased.

Still another object is to obtain power and torque increases in the output of V-8 engines having hemispherical combustion chambers by harmonic resonant tuning of the induction system thereof and by continuously injecting the fuel into such system.

Other objects and advantages of our invention will be more apparent as this description progresses, reference being had to the accompanying drawings wherein:

Figure 2 is a plan view of the air-fuel distribution system of our invention in relation to the opposite cylinder blocks of the engine which have been illustrated in section;

Figure 3 is an elevational view, partly in section, of the air-fuel intake system of a pair of cylinders of the engine in Figure 1 illustrating the novel manifolding of our invention with the fuel injection nozzles located in the intake system of the engine intermediate the throttle blade of the air intake and the intake valve;

Figure 4 is a modification taken similarly to that of of Figure 3 showing the fuel injection nozzles located intermediate the throttle blade of the air intake passage and the outer or external entrance thereof;

Figure 5 is a schematic view of the air-fuel distribution and control mechanism of our engine shown in Figure 1 illustrating the engine cylinders, valves and intake conduits in relation to the solid fuel injection structure therefor including nozzles, valves, fuel distribution block and other control mechanism;

Figure 6 is an elevational view of a portion of the accelerator operable feed valve control linkage of Figure 5;

Figure 7 is a cross sectional view of the air-fuel distribution and feed control unit of Figure 5;

Figure 8 is a cross sectional view taken on the line 7—7 of Figure 7;

Figure 9 is a cross sectional view of one of the fuel injection nozzle structures of Figures 1 through 5 inclusive, and showing the angular relationship of the nozzle to the wall of the intake conduit;

Figure 10 is a cross sectional view of the bypass valve and jet of Figure 5;

Figure 1:
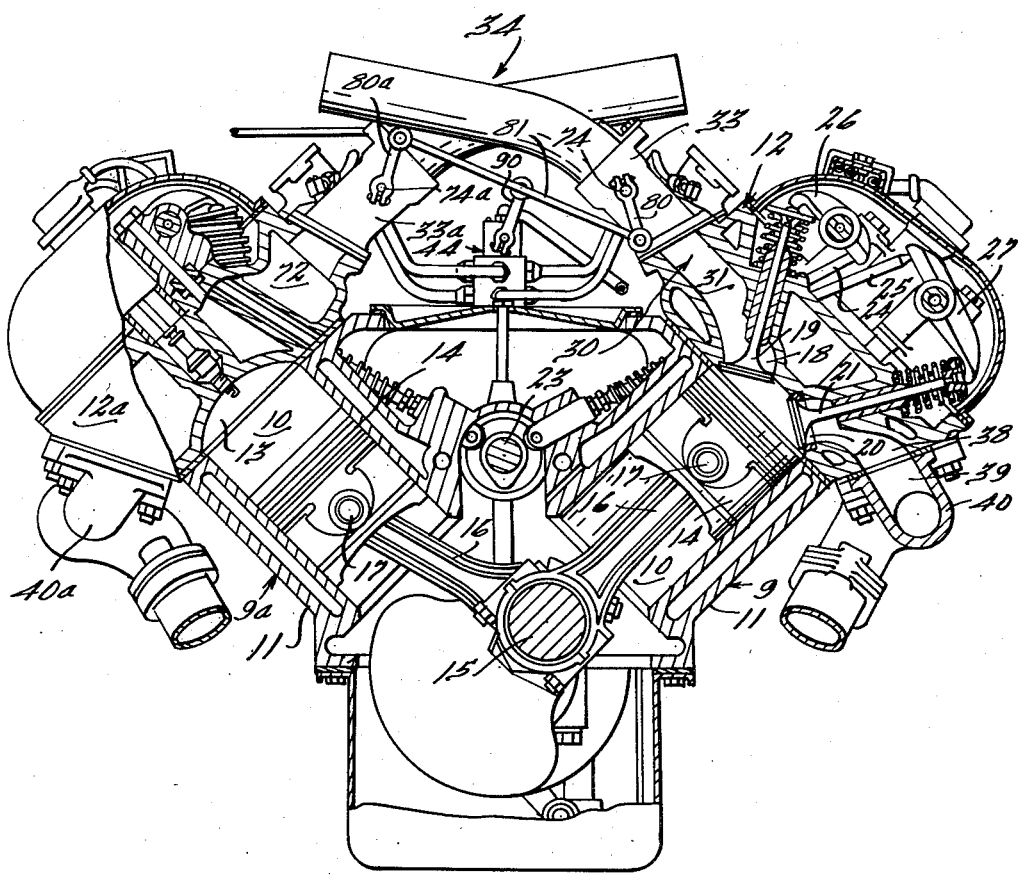
Figure 1 is an end elevational view partly in section of a current-type 8-cylinder overhead valve V engine provided with the continuous solid fuel injection manifolding of our invention and designed to provide harmonic resonant tuning of the air intake system, the portion in section being taken approximately on the line 1—1 of Figure 2.

Figures 11, 12, and 13 are cross sectional views of modifications in the shaping of the outer end portions or entrance of the air intake conduits; and Figure 14 is a schematic view of the intake system of the engines of Figures 1 to 4 inclusive illustrating the manner of feeding pressurized air into the intake system.

Referring now to the drawings wherein similar numerals are used to designate similar parts in the structure, Figure 1 shows a cross-section of a V-8 engine of current manufacture having a 3.812 in. bore, a 3.625 piston stroke, and 331 cu. in. displacement and provided with the new intake manifolding and controls of our invention.

As seen in Figures 1, 2, and 5, the engine has two banks 9 and 9ª of cylinders 10 arranged at 90° in cylinder block 11 and to which cylinder heads 12 and 12ª are secured and provided with hemispherical combustion chambers 13 immediately over each cylinder 10. The cylinders of each bank are aligned longitudinally of the engine, and the cylinders of the opposite banks are offset longitudinally relative to each other. For convenient reference, the cylinders of the cylinder bank which is to the left looking forwardly from the flywheel end of the engine are numbered 1, 3, 5, and 7 starting such numbering at the opposite or fan end of the engine, and those of the right bank are numbered 2, 4, 6, 8 respectively, these numbers appearing internally of the cylinder representations in Figures 2 and 5.

Each cylinder is provided with a piston 14 reciprocable therein and operably connected to a crankshaft 15 through a connecting rod 16 and wrist pin 17. Crankshaft 15 may be a 90° crankshaft wherein double crank throws are arranged at 90° to each other, the first connecting with the pistons of cylinders 1 and 2, the second with cylinders 3 and 4, the third with cylinders 5 and 6, and the fourth with cylinders 7 and 8. Alternatively, the second and third throws may be interchanged such that the second throw is 270° of crank rotation from the first throw counting clockwise looking at the flywheel end of the engine whereas in the first described arrangement the second throw is only 90° of crank rotation from the first.

Various firing orders are possible for the two described crank arrangements, an example of that for the first being 1—8—4—3—6—5—7—2 and an example of the second being 1—8—6—5—4—3—7—2, these firing orders providing alternate suctions between opposite banks of cylinders except for two cylinders of each bank which fire successively, to wit, the cylinders 8 and 4 and 5 and 7 in the first crank arrangement and the cylinders 8 and 6 and 3 and 7 of the alternative crank arrangement.

The hemispherical combustion chambers or cavities 13 of the cylinders 10 are by preference each provided with a single inlet opening 18 closed by an inlet valve 19 and with a single smaller exhaust outlet 20 closed by an exhaust valve 21, these valves being arranged transversely of the longitudinal axis 22 of the engine and at a substantial angle, for instance 60° to each other, and on a great arc of the spherical segment forming the combustion chamber 13.

The inlet and exhaust valves of both banks of the engine are operable from a single camshaft 23 located above the crankshaft 15, the camshaft actuating roller tappet push rods 24 and 25 respectively of the inlet and exhaust valve mechanism which in turn actuate respectively the inlet valve rocker arm 26, and exhaust valve rocker arm 27, these rocker arms actuating in turn the normally spring-held-closed valves 19 and 21.

By preference the camshaft 23 is arranged to open the respective inlet valve 19 before top dead center position of the piston and to close the exhaust valves after top dead center position of the piston so as to maintain the intake valve open during a large portion of crank rotation and to maintain the exhaust valve open long enough to obtain an overlap between opening of the inlet valve and closing of the exhaust valve of each cylinder.

As seen in Figure 3 the inlet opening 18 and the inlet valve 19 for each cylinder are located at the inner terminus of an intake or induction passage or conduit system generally designated by the numeral 30 in the cylinder bank 9 and by the numeral 30ª in the cylinder bank 9ª. Each intake passage system 30, 30ª comprises as seen in Figure 3 a cored passage portion 31 in the cylinder heads 12, 12ª of rectangular section above the circular valve port 18, a passage portion 32 of rectangular shape in the bodies 33, 33ª of the external intake structure generally designated by the numeral 34 which passage 32 forms a continuation of the passage 31 and changes to a circular sectioned passage 35 midway the depth of the bodies 33, 33ª and a passage 36 provided in the tubular stacks or extensions 37, 37ª which passage 36 is an extension of the circular passage 35. While it is preferred that the passages of the intake system 30 be of the same section throughout its length, where practical considerations dictate otherwise it is preferred that the cross sectional area be maintained constant and that the change from one section shape to another be such that no block to the free movement of the air be injected except, of course, as may be necessary by a throttle blade.

The exhaust valves 21 (see Figure 1) are associated with exhaust passages 38 in the cylinder heads 12 and 12ª and these connect with passages 39 of a collection headers 40, 40ª of the exhaust manifolding which conducts the exhaust gases away from the combustion chambers 13 during the exhaust stroke of the pistons.

Figures 2-9 inclusive illustrate our novel air-fuel feed, distribution and control system as applied to a V-8 engine and which provides for continuous pressure feeding of a solid fuel such as methanol or alcohol from a source as a tank 41, by means of a pump 42 to a central distribution unit or structure 44 incorporating an accelerator operable feed control valve means 46 and means for directing solid fuel to the individual fuel injection nozzles 48 located in the intake passage 30, 30a of the engine as hereinafter pointed out.

The externally mounted intake structure 34 as seen in Figures 1 to 3 is disposed between the two banks of cylinders of the engine and comprises the two elongated independent similar opposite conduit sections, or bodies 33, 33ª and the air intake stacks or extensions 37, 37ª. The sections 33, 33ª have their bottom mounting faces or flanges 50, 50ª respectively, seated on the oppositely facing angular seats 53, 53ª respectively of the cylinder heads 12 and 12ª through intervening gaskets 54 and 54ª respectively. Suitable bolts 55, seen in Figure 2, secure these sections to the cylinder heads.

In order to permit the use of the same section on each cylinder head, the opposite ends of the sections are in reverse relationship to each other.

Extending upwardly from the base portions 50 of the sections 33, 33ª and in the same planes as the respective cylinder axes are tubular wall portions 56 forming the passages 32, 35 of each section there being four such wall portions 56 in each section as seen in Figure 2. The wall portions 56 define the rectangular transverse passages or conduits 32 that open through the base portions 50 into registry with the inlet valve passages 31 of the cylinder heads 12, 12a, and define the circular passage portion 35 forming continuations of the passages 32. The outer end portions of the passages 35 adjacent the top side of the sections 33, 33a are bored as at 58 to telescopically receive and mount in the wall portions 56, the cylindrical tubular stacks or extension members 37, 37a of the intake passages 30, 30a. These extensions provide passages 36 which are preferably of similar shape and area to the passages 35. Each wall portion 56 is provided with a flange 62 to which is secured by a bolt 63 a clamping bracket 64 for securely positioning the extension members 37, 37a.

The extension members 37, 37a of the air intake conduits of each bank of cylinders extend transversely of the engine in the direction of the opposite bank thereof and with their respective portions in a common plane and those of one bank cross the adjacent extensions of the opposite bank, as seen in Figure 3 at the mid section of the engine. These extension members 37, 37a, as seen in Figure 2, are shaped to lie in juxtaposition to each other, and to effect this each extension is provided with a double i. e. flat S curve, as seen in Figure 2, and an elbow bend as in Figure 3, in the vicinity of their crossing. It will be observed that each of the extension members 37, 37a starts with a relatively short, straight portion 66 at its mounting end in the bore 58 then, as previously indicated, takes, as seen in Figure 2, a shallow double or reverse bend 67 which appears in Figure 3 as a single bend and then again becomes a straight portion 68 which is unsupported and which extends over the opposite intake section and over the two directly opposite cylinders and in a plane substantially midway between the latter. Thus, for example, the extension member 37a emanating from the manifold section 33a, adjacent the cylinder 2 terminates intermediate the directly opposite cylinders 1 and 3 and immediately above the opposite intake section 33. It will be observed that the angle formed between the two straight portions 66, 68 of the extension members 37, 37a is approximately 150° in the plane of Figure 3. Moreover, as seen in Figure 2, the extensions are shaped complementary to each other and lie side by side. The described construction of the extension members permits a compact manifold construction facilitating the use of separate intake extension members for each cylinder and in a manner providing adequate length for the purposes of our invention.

As seen in Figures 1 to 3, for example, the intake sections 37, 37a have suitable outwardly projecting cylindrical wall portions 70 providing passages 71 for conducting water to the cylinder head water passages 72. The lower ends of these passages 71 register with the water passages of the cylinder heads and the upper ends are arranged for receiving a water connection through the provision of a mounting flange portion 73 associated with the wall portion 70. As seen in Figure 3, the wall portions 70 extend in a direction opposite to that in which the tubular wall portions 56 of the intake passages extend.

Each of the passages 35 of the intake sections 37, 37a are provided with rotatably adjustable throttle or passage closing blades 74. The blades of each intake section are preferably mounted on a common shaft extending lengthwise of the sections across the walls 56 of the passages 35. Thus a shaft 75 extends through the intake section 33 and carries all the throttle blades 74 of the intake passages of the right bank of cylinders in Figure 3 and a shaft 75a extends through the section 33a and carries the blades of the left bank of cylinders. The blades on each shaft will be identically positioned, rotatably speaking, that is to say, in alignment such that all the throttle blades of a single intake section may be moved simultaneously and to a similar predetermined position of opening or closing of the passages 35 of that section. The shafts 75, 75a are suitably supported in bearings provided by cross webs 78 of the intake sections 33, 33a connecting the wall portions 56 of the passages 35 serving the two endmost cylinders at each end of the cylinder banks.

The shafts 75, 75a are operably connected adjacent the right hand end of the intake sections in Figures 2 and 5 by similar levers 80, 80a through intermediate rod means 81 pivotally connected to these levers which enable the shafts 75, 75a to be simultaneously operated. Secured to the shaft 75a intermediate the intake extension members 37a for cylinders 4 and 6 of the engine is a further lever 82 which is operably connected with a lever 83 on a main throttle shaft 84 (see Figures 5 and 6) through linkage 85 pivotally associated therewith. This shaft 84 is arranged for operation by the accelerator pedal 86 through further mechanism, for example the lever and linkage mechanism 87, 88 schematically illustrated in Figure 6. The various levers operating the throttle blades 74 are positioned to cause the shaft 75 to be rotated clockwise (Figure 6) in response to depression of the accelerator pedal, and the shaft 75a counterclockwise in Figures 3 and 6, in response to forward depression of the accelerator pedal, whereby to shift the throttle blade 72 of both manifold sections to open position.

It will be noted that further levers 89, 90, and a link means 91 pivotally secured to these levers, operably connects the shaft 75a and the rotatable member 92 of the cam valve 46 of the fuel distribution block. When the accelerator 86 is depressed to increase the throttle openings in the air passages, the member 92 of the valve 46 is correspondingly moved to positions admitting greater quantities of solid fuel to the central fuel chamber of distribution block 44 generally referred to by the numeral 93.

Suitable spring return means 94 is provided at the accelerator or (not shown) in the throttle linkage to return the accelerator pedal and throttle blades as well as the valve 46 to their respective so-called closed positions when the accelerator is fully released. At wide open throttle position of the accelerator, the throttle blades 74 will preferably be in a position paralleling the axes of the intake passages 30, 30a such being the full open position of the blades. The throttle blades 74 will assume the substantially closed position of the passages 30, 30a shown in Figure 3, at the released position of the accelerator pedal and will be preferably slightly open at the engine idle position of the accelerator.

By preference a suitable stop, for instance the stop 95 (Figure 6) will be provided at the accelerator end of the operating linkage to positively prevent spring or twisting of the linkage and operating shafts of the throttle mechanism should the operator attempt to force the throttle blades 74 beyond wide open position thereof. The provision of such a stop also assures uniformity of positioning of the throttle blades at the intermediate positions. A similar stop 96 is preferably provided at the fully released position of the accelerator whereby to keep the throttle blades 74 open a few thousandths of an inch at this position of the accelerator. Should a lost motion mechanism be provided in the accelerator link 87, the stop 95 will preferably be located adjacent the lever arm 88.

Referring now to Figure 5, the pump 42 is preferably driven from the engine camshaft through suitable reduction gearing, not shown, at one-half engine speed. This pump draws solid fuel from the tank 40 to its inlet or suction side 99 through a suitable feed line 100.

In order to control the output pressure of the fuel, a pressure-regulating bypass valve 102 is provided intermediate the intake side 99 and discharge side 101 of the pump, this valve being connected to the intake side by a feed line 103 and to the discharge side by a feed line 104. The pressure regulating valve 102 may be a conventional normally closed ball check valve which will open to return fuel to the intake side 99 when the pressure of the solid fuel at the discharge side 101 of the pump exceeds a predetermined value, for example, a peak pressure of 40 lbs. per square inch.

From the discharge side 101 of the pump a feed line 105 connects with the leg 106 of a T-connection 107 having head portions 108, 109. A feed line 110 connects the head portion 109 with an inlet fitting 111 located at the top side of the fuel distribution block 44.

In order to additionally control the density of the air-fuel mixture delivered to the engine during low and high speed operation and to maintain satisfactory fuel pressure for starting and idling operation of the engine, we provide a combination bypass check valve and jet 112 between the delivery 101 of the pump 42 and the fuel tank 41. The valve 112 comprises, as seen in Figures 5 and 10, a hollow cylindrical housing 114 provided with a chamber 115 and having at one end thereof a threaded extension 116 which connects by means of a feed line 117 with the portion 109 of the T-connection referred to above. The extension 116 provides the inlet side of the bypass and has a bore 118 terminating at its inner end in a tapered valve seat 119 opening into the chamber 115. A complementary tapered valve operating member 120 is normally maintained on the seat 119 by a compression spring 121 which operates between the member 120 and a jet carrying element 122 threadedly secured in the opposite end of the housing 114 and sealed by a rubber ring 122ª. The element 122 is connected by a feed line 123 with the tank 40 as at 124. The element 122 is provided with a fuel conducting passage 125 internally threaded at its inner end to securely mount a jet member 126 having a shouldered portion 127 secured against the inner face of the element 121 and having an inwardly directed tip 128. The jet 126 is bored with a fine size passage or orifice 129 for bleeding fuel from the chamber 115 to the feed line 123 for return to the tank.

The size of the passage 129 in the jet 126 may be altered to meet the conditions of operation. It has been found in operation that a restricted orifice between fifty thousandths and sixty thousadths of an inch in diameter permits a satisfactory pressure build-up and fuel bleed for high speed operation. Moreover, the spring 121 will preferably be of such strength as to keep the valve 120 seated until the fuel pressure is at least about five lbs. per square inch. In this manner there is sufficient fuel pressure for starting and idling. About five lbs. per square inch until about 15 lbs. per square inch pressure, the valve 120 still has some control over the amount of fuel fed, it operating in conjunction with the bleed passage to insure a richer air-fuel mixture during low speed operation. Above 15 lbs. per square inch the valve 120 will be fully open and will permit maximum return of a portion of the fuel discharged by the pump back to the reservoir or tank 40.

As seen in Figures 5, 7, and 8, the fuel distribution control block 44 comprises an upper valve assembly portion 44ª having the valve 46 and which is secured by screws 130 to a lower distribution section 44ᵇ containing the central fuel chamber 93. The valve 46 comprises a rotatable member 92 having a cylindrical or barrel portion 131 and a shaft extension 132, the former fitted in a horizontal bore or chamber 133 and controlling passage of fuel between an inlet port 134 to which fuel is delivered by the feed line 111 and a discharge port 135 directly opposite the port 134, which connects with the vertical branch 136 of the chamber 93. The barrel portion 131 is provided with a crescent-shaped surface recess 137 the width of the ports 134, 135 which provides with the wall portion of the chamber 133, a fuel conducting passage between the feed line 110 and the chamber 93 when the valve member 92 is rotated to a position where this recess 136 connects the ports 134, 135. The barrel portion 131 provides a remaining surface area which in further positions of the member 92 completely closes either the port 134 or the port 135.

The shaft extension 132 projects through a suitable bearing 136 and connects with the operating lever 90 (Figure 5). Between the barrel portion 131 and the bearing 136 is an O-ring 137ª which seals this end of the valve structure when the barrel is biased to the right.

The opposite end of the barrel 131 from the shaft extension 132 is recessed and provided with a conical-shaped bottom 138 in which is seated under bias of a compression spring 139 the spherical face 140 of a shouldered button 141. One end of the spring 139 is mounted on the shouldered portion of the button 141 and its opposite end seats in a recess 142 of a plug 143 threadedly mounted in a threaded end 144 of the bore 133. The plug seals this end of the valve structure in conjunction with an O-ring seal 145. The spring 139 effects a lateral bias on the valve barrel 131 through the button 141 causing a compression of the O-ring seal 137 to thereby seal the shaft end of the valve mechanism. The button 141 performs the novel function of providing substantially uniform friction loading on the barrel 131 during rotation of the valve member 92 in either direction of rotation and of preventing windup of the biasing spring 139.

As previously noted, the discharge port 135 of the valve 46 opens into an elongated vertical passage 136 of the distribution chamber 93 of the block 44ᵇ. Moreover, as seen in Figures 7 and 8, the chamber 93 also has lateral passages 146 leading from the vertical passage 136 and connecting with discharge fittings 147 arranged around the four sides of the block 44ᵇ there being two lateral passages 146 at each side of the block and in vertical alignment.

The discharge fittings 147 connect, as seen in Figures 2, 3, 4, 5, 7, 8, and 9, by suitable feed lines 150–157 inclusive, with the fuel jets 48 of the respective intake passages 30, 30ª of the engine. In the schematic showing of Figure 5, the feed lines connecting with each side of the block 44 are shown side by side, whereas they are one above the other and the connection 111 is shown entering a side face, whereas it actually enters the top of the block 44. Thus one pair of fittings 147 connect by the feed lines 150—151 with the jets 48 for the cylinders 1 and 5. A second pair of directly opposite fittings 147 connect by the feed lines 152, 153 with the jets 48 of the cylinders 2 and 8. A third pair of fittings 147 connect by the feed lines 154, 155 with the jets 48 of the cylinders 3 and 4 and a fourth pair of fittings 147 connect by the feed lines 156, 157 with the jets 48 of the cylinders 5 and 6.

It will be observed from Figures 2 and 5 that the feed lines 150–157 inclusive, from the fuel distribution block 44 are arranged such that feed lines for the injection nozzles of each pair of adjacent end cylinders extend to between the projecting intake conduits for such pair of cylinders and connect with the injection nozzles 48 thereof at an angle of approximately 45° to the axis of the engine. This arrangement aids in keeping the lengths of the feed lines substantially uniform and serves to assure uniform distribution of fuel to each injection nozzle 48.

The fuel injection nozzle structure generally referred to by the numeral 48 is shown in detail in Figure 9. It comprises an L-shaped base or body 160 having leg portions 162 and 164 projecting therefrom at substantially right angles to each other. The leg 164 is externally threaded for effecting a threaded mounting connection with, for example, a threaded bore 166 of the wall portions 56 of the intake sections 33, 33ª, as seen for instance in Figure 3. The body 160 has a large bore 168, the outer end of which is threaded to receive a tapered plug 169, and the inner end of which is provided with a tapered land or shoulder 170. The leg 164 has an internal bore 171 coaxial with an opening into the bore 168. Bore 171 is smaller than the bore 168 and it has soldered therein a tubular nozzle 172.

The nozzle 172 has a tapered flange or lip 173 which seats against the land 170 and itself provides a seat 174 for a dished fuel strainer 176 which is biased against such seat by one end of a compression spring 178 having its opposite end bearing against the plug 169.

The nozzle 174 is transversely notched adjacent its outer end, as at 180 to a depth slightly below the axis of the nozzle. This notch comprises intersecting flat faces 182 and 184 forming a 90° angle with each other and each arranged at a 45° angle with the nozzle axis. The nozzle has a central feed bore or passage 186 provided with an enlarged entrance 187 adjacent the lip 173, and which reduces to a needle-like passage or orifice 188 adjacent the notch 180 and opens into the notch 180 in the face 182 thereof. It will be apparent that the solid pressurized fuel after entering the bore 168 from a passage 189 in the leg 162 from a feed line such as any of the feed lines 150—157 will pass through the strainer 176 to the passage 186 and will be discharged through the orifice 188 from which it will impinge upon the face 184 of the notch and be dispersed and atomized in the intake passages 30, 30ª in the direction of the intake valves.

We preferably employ a dished strainer 176 of screen-like character having a sufficiently fine mesh to insure that any particles of matter going through the strainer will also go through the needle passage 188. Moreover, the strainer should be of sufficient area, to avoid plugging of the fuel inlet passage and consequent difficulty in fuel feeding if dirt should get into the fuel injection system and be stopped by the strainer 176. In our operation, with an injection structure of this character, it has been found that a strainer of .009 wire and 50 mesh having a circular projected area of about ¼ inch in diameter and conforming to the spherical shape of a ½" ball will provide satisfactory operation under known conditions.

As previously stated, we have found that the intake passage length is a highly significant factor in obtaining optimum engine torque or power and it is an important feature of our invention to provide the herein described engines utilizing fuel injection with intake systems having harmonic resonant tuning over a particular speed range of the engine, to effect this result.

However, since the point of injection and condition and type of fuel as well as the temperature and pressure in the intake system have an effect on the velocity of sound in the intake passages, it is usually difficult to prescribe definite values for C in the above empirical formula under operating conditions without instrument readings or extended calculation. We have found that an alternate procedure is possible. Thus if the value for C in the above formula can be taken as that of the velocity of sound in air at the expected atmospheric temperature and pressure conditions prevailing where the engines are to be run, a value for L is obtained by the formula that is in the desired resonance range and which is sufficiently close for all practical purposes. The system length may be varied above and below this value if desired by a series of tests to obtain the optimum resonant condition and peak performance values.

To illustrate this procedure, let it be assumed it is desired to obtain optimum performance in a V engine of the character disclosed in a speed range between 4,000 to 5,200 R. P. M. Using the above formula, we find that the value for L at 4,600 R. P. M., the mid speed of the desired speed range, using a value for C of 1,126 feet per second (the velocity of sound in air at a temperature of 68° F. and at atmospheric pressure) is 17.6". Using 18" as the system length a conventional V engine of 10.8:1 compression ratio modified as herein described, produced on test using methanol fuel 442.5 pounds foot torque and 403.8 brake horsepower.

This result is outstanding when compared to results obtained with conventional V engines of similar displacement and when it is considered that prior applications of fuel injection feeding have always emphasized an extremely short distance between the air entrance and the intake valve seats of the engine.

It will be understood that the foregoing empirical formula as we have used it, does not give the intake system length as an exact distance, but gives a value close enough to the critical area in which optimum resonance conditions exist to show the exceptional results possible and which may in some cases be improved upon by trying several other system lengths.

By experimentation we have found that the value of L as from the above empirical formula by the alternate procedure may be varied in many cases plus or minus 10 to 15%, or stated otherwise, as much as plus or minus 3", with good results, it being noted that when the length of the system giving a harmonic resonant condition is exceeded an increase in peak torque and a decrease in peak power of the engine is obtained, whereas both drop if the system length is made less than that providing optimum resonance.

It will be further understood that greater deviations in the system length than the above will still provide substantial benefits in performance over those previously obtained since even these lengths are much greater, relatively speaking, than those which to our knowledge have been employed on known engines.

To illustrate the effect of variations in length, the following data are given, for illustration only, with respect to a 331 cu. in. engine operated at 13.1 compression ratio and from which optimum performance was desired in a speed range of 4,000 to 5,400 R. P. M. This engine was provided with a straight stack or intake extension, as shown in Figure 3, and the injection nozzles were located between the air throttle blade and the intake valve of the engine as shown in that figure. The length L derived from the formula using a speed value of 4,400 R. P. M. for N and a value of 1,126 for C, was 20.75 inches. This length in one test produced 471.9 lbs. foot torque at 4,000 R. P. M. and 435.7 brake horsepower at 5,400 R. P. M. When the length was decreased to 19¼", the peak torque fell to 469.3 lbs. foot torque at 4,000 R. P. M. and the power peak fell to 432.5 brake horsepower at 5,400 R. P. M. On the other hand, when the length of the intake system was increased to 22.75" the peak torque at 4,000 R. P. M. rose to 475.4 lbs. foot torque and the peak power dropped to 424.9 brake horsepower at 5,400 R. P. M.

As stated above, the location of the injection nozzles 48 within the intake system of the engine is found to have some bearing on the frequency at which resonance occurs in the system and although the difference is relatively small, it can be of importance where top peak values are desired in engine torque performance.

Moreover, the location of the injection nozzles is important from the standpoint of putting colder and hence denser mixtures into the cylinders. Thus if the fuel injection nozzles 48 are moved from the position shown in Figure 3 to beyond the air throttle blades and between the latter and the air intake entrance of the intake system, as illustrated for example in Figure 4 where the injection nozzles 48 are mounted in protuberances 200 of the air intake extensions 37, 37ª, several results are apparent which contribute to increased torque. First it appears possible to move the nozzles near the open end of the pipe entrance to enhance evaporation and charge densification yet avoid fuel losses outside of the pipe in operation. Secondly, the fuel, for instance alcohol, has a cooling effect on the air-fuel mixture at the throttle blade when the injection nozzle is upstream therefrom as in Figure 4. In a test run made with the Figure 4 arrangement, in which the injection nozzle was about 5" from the air entrance, this test being made on the 331 cu. in. engine aforesaid having an intake system length of 20.75" the torque output increased to 483.2 lbs. foot at 4,000 R. P. M., whereas the power output reading of 435.4 brake horsepower at 5,400 R. P. M. remained about the same as before.

We have further discovered that if the entrance of the air intake tubes 37, 37ª of the intake manifold be formed with an outwardly curved flare or bell mouth entrance, as illustrated at 210 in any of Figures 11–13 inclusive, further improvements in peak power and torque output are possible over the Figure 3 arrangement where the tube inlet is not enlarged but is of the same size as the passage 36 in that figure. In this connection it may be stated that with the straight stack without flared entrance, the resonance effect appears to be one of a damped character rather than sharp and the effect is to raise the peak power and torque throughout a speed range with peaks for each at certain speeds whereas flaring the entrance gives a sharp resonance condition and effects a sharp rise in the peak torque and power at specific engine speeds. The reason for the improvement is not exactly understandable, but it is believed that shaping of the air entrance in the manner described effects an intensified resonance of the engine intake system at the peak speeds.

To illustrate the possibilities of flaring the air entrance of the intake tube comparison may be made with the results of a single run made with a 271 cu. in. engine of the disclosed character operated at a 12:1 compression ratio. In the run using an intake system length of 21", a straight entrance tube as in Figure 3, and with the injection nozzles located between the throttle blades and the intake valve as in Figure 3, the engine produced 367 lbs. foot torque at 4,800 R. P. M. and 357.8 brake horsepower at 5,600 R. P. M.

The same engine provided with a flared entrance of 1¼" extending lengthwise of the tube in Figure 11 thus making the length of the intake system 21¼" to the extreme end of the tube, produced on test 377.2 lbs. foot torque at 4800 R. P. M. and 365.1 brake horsepower at 5600 R. P. M.

Other changes in shape of the air entrance appeared to similarly affect the resonance condition of the air intake system and may be found valuable where peak torque or power conditions are desired at particular speed ranges. For example, in one run a 271 cu. in. engine of the Figure 3 construction operated at 12:1 compression ratio and having an intake system 20¹¹⁄₁₆" in length provided with an 8" conical entrance as in Figure 12 (but omitting the flared entrance) produced 360.4 lbs. foot torque at 4800 R. P. M., 366.1 brake horsepower at 5600 R. P. M and 373.8 brake horsepower at 6,000 R. P. M.

By combining with the conical tube the flared entrance as in Figure 12, or modifying the Figure 12 arrangement to include a nozzle or horn member 216 supported by circumferentially spaced struts 218 from the flared lip 210, all as shown in Figure 13, other modifications of the resonance of the intake system are obtained and make possible increased peak torque in selected speed ranges, for example, 4500 to 5600 R. P. M.

In Figure 5 the numeral 220 represents the magneto of the engine which is driven from the normal engine distributor drive mechanism, not shown. From this magneto the usual current-conducting high tension leads 222 extend to the plugs 224 of the respective cylinders to provide ignition for the engine.

Stronger charging effects may be obtained in the cylinders of the engines of our invention having harmonic resonant tuning of the intake system if the air entering the intake stacks or pipes has been previously densified as by pressurizing or supercharging.

This may be accomplished, for example, as illustrated schematically in Figure 14 in relation to the intake systems of Figures 1–4 inclusive. As there shown, all of the intake stacks or extension members 37 of one bank of cylinders are connected as by welding, with a closed air chamber 230 and the extension members or stacks 37ª of the opposite bank are similarly connected with a chamber 230ª.

The chambers 230, 230ª may be of any shape desired, for example cylindrical, but each must be of a sufficient size and volume so as not to adversely affect harmonic resonant tuning of the individual induction passages of the engine connecting with these chambers. The chambers 230, 230ª are each preferably connected by well known means to a single, or separate blowers 232, 232ª suitably driven from the engine and which supply air under pressure to the chambers 230, 230ª for distribution to the intake passages.

It will be understood that the form of stacks or extension members illustrated in Figures 11, 12, and 13 may be similarly connected to air chambers such as the chambers 230, 230ª.

From the foregoing description of our invention, it will be evident that we have presented a new and novel method and structure and controls therefor for increasing the torque and/or power performance of engines. It will be apparent that various departures from the specifically disclosed technique and embodiments will occur to those skilled in the art without departure from the letter, spirit and intent of the present invention.

For example, although we have shown each cylinder provided with an independent induction passage system, substantial benefits may be derived by applying the features of our invention to fuel injection engines having individual air intake pipes with Siamese ends feeding one or a pair of cylinders or arranged as in typical line engines to feed a plurality of cylinders. Moreover, although our invention has emphasized engines with fuel injection feeding and wherein the fuel is continuously fed into the intake system, some of the benefits of our invention are obtainable where the fuel feeding is of the timed type. Continuous fuel feeding is preferred, however, because where timed injection of the fuel is employed in our induction system, it will be apt to cause incomplete or inadequate evaporation of the fuel in the time available. This has the effect of providing less cooling of the charge and of decreasing the density of the air fuel mixture in the induction system. Accordingly, it is desired that the present invention be construed to include all equivalents and as broadly as the claims taken in conjunction with the prior art may allow.

We claim:

1. In an internal combustion engine of the multi cylinder type, cylinder head means providing a combustion chamber and an inlet port and valve for each cylinder, intake means mounted on said head comprising a plurality of elongated intake stacks, one for each cylinder, each stack having an independent outboard inlet associated with a source of air and each stack defining with the cylinder head means for its associated cylinder a continuous intake passage independent of those of the other cylinders and extending from the inlet port of its associated cylinder to its said outboard air inlet, the total length of each said intake passage between said terminal points being that which provides a condition of substantial harmonic resonance between the sound waves produced in said passage by the suction cycle of the engine and the reflected sound waves transmitted through said intake passage at the predetermined engine speed at which engine performance is to peak, the said passage length in inches being approximately $$\frac{72C}{N} \pm 3$$

where N is the engine speed in revolutions per minute at said predetermined speed of the engine and C is the velocity of sound in feet per second in said intake passage under the specific temperature and pressure condition expected.

2. In an internal combustion engine of the multi cylinder type, cylinder head means providing a combustion chamber and an inlet port and valve for each cylinder, intake means mounted on said head comprising a plurality of elongated intake stacks, one for each cylinder, each stack having an independent outboard inlet associated with a source of air and each stack defining with the cylinder head means for its associated cylinder a continuous intake passage independent of those of the other cylinders and extending from the inlet port of its associated cylinder to its said outboard air inlet, the total length of each said intake passage between said terminal points being that which provides a condition of substantial harmonic resonance between the sound waves produced in said passage by the suction cycle of the engine and the reflected sound waves transmitted through said intake passage at the predetermined engine speed at which engine performance is to peak, the said passage length in inches being substantially equal to $$\frac{72C}{N} \pm 3$$

where N is the engine speed in revolutions per minute at said predetermined speed of the engine and C is the velocity of sound in feet per second in air under the atmospheric temperature and pressure conditions at which the engine is to be operated, a fuel inlet in each intake passage in that portion thereof defined by said intake means, and means for continuously supplying fuel to said fuel inlets.

3. In an internal combustion engine of the multi-cylinder type, cylinder head means providing a combustion chamber and an inlet port and valve for each cylinder, intake means mounted on said head comprising a plurality of elongated intake stacks, one for each cylinder, each stack having an independent outboard inlet associated with a source of air and each stack defining with the cylinder head means for its associated cylinder a continuous intake passage independent of those of the other cylinders and extending from the inlet port of its associated cylinder to its said outboard air inlet, the total length of each said intake passage between said terminal points being that which provides a condition of substantial harmonic resonance between the sound waves produced in said passage by the suction cycle of the engine and the reflected sound waves transmitted through said intake passage at the predetermined engine speed at which the engine performance is to peak, the said passage length in inches being approximately equal to $$\frac{72C}{N} \pm 3$$

where N is the engine speed in revolutions per minute at said predetermined speed of the engine and C is the velocity of sound in feet per second in said intake passage under the specific temperature and pressure conditions expected, a throttle in each intake passage and fuel injection means for continuously supplying fuel in each intake passage positioned upstream of the throttle.

4. In an internal combustion engine of the multi-cylinder type, cylinder head means providing a combustion chamber and an inlet port and valve for each cylinder, intake means mounted on said head comprising a plurality of elongated intake stacks, one for each cylinder, each stack having an independent outboard inlet associated with a source of air and each stack defining with the cylinder head means for its associated cylinder a continuous intake passage independent of those of the other cylinders and extending from the inlet port of its associated cylinder to its said outboard air inlet, the total length of each said intake passage between said terminal points being that which provides a condition of substantial harmonic resonance between the sound waves produced in said passage by the suction cycle of the engine and the reflected sound waves transmitted through said intake passage at the predetermined engine speed at which the power performance is to peak, the said passage length in inches being approximately equal to $$\frac{72C}{N} \pm 3$$

where N is the engine speed in revolutions per minute at said predetermined speed of the engine and C is the velocity of sound in feet per second in air under the atmospheric temperature and pressure conditions at which the engine is to be operated, and fuel injection nozzle means positioned to continuously deliver fuel to the intake passage of each cylinder at a location therein defined by said intake means.

5. In an internal combustion engine of the multi-cylinder type, cylinder head means providing a combustion chamber and an inlet port and valve for each cylinder, intake manifold means mounted on said head comprising a plurality of elongated intake stacks extending transversely of the engine in generally parallel relationship, one for each cylinder, each stack having an independent outboard inlet associated with a source of air, and each stack defining with the cylinder head means for its associated cylinder a continuous intake passage independent of those of the other cylinders and extending from the inlet port of its associated cylinder to its said outboard air inlet, each said intake passage being of a length to provide harmonic resonance at the peak performance of the engine and corresponding to a length which in inches is approximately $$\frac{72C}{N} \pm 3$$

where N is the engine speed in revolutions per minute at which the engine performance is to peak and C is the velocity of sound in feet per second in said intake passage under the specific temperature and pressure conditions expected, and means for continuously supplying fuel under pressure greater than atmospheric to each of said passages, said means having a fuel discharge outlet in that portion of the said intake passage defined by said intake manifold.

6. In an internal combustion engine of the multi-cylinder type having longitudinal and transverse axes, cylinder head means providing a combustion chamber and an inlet port and valve for each cylinder, intake means including an elongated intake stack for each cylinder extending generally parallel to at least one of said axes of the engine and a body portion mounted on said head for supporting said stacks, said stacks being of substantially tubular section throughout their length and the outboard ends thereof defining an inlet, said head and intake means defining for each cylinder portions of a continuous intake passage independent of those of the other cylinders extending from said inlet port thereof through said head, intake body portion and stack to the said outboard inlet of the latter, said intake passage having a length in inches substantially equal to $$\frac{72C}{N} \pm 3$$

where N is the engine speed in revolutions per minute at which the engine power performance is to substantially peak and C is the velocity of sound in feet per second in air under the atmospheric temperature and pressure conditions at which the engine is to be operated, and fuel injection means for continuously supplying fuel to said intake passage at a position intermediate the terminal poionts of said intake passage portion in said stack supporting body.

7. In an internal combustion engine of the multi-cylinder opposed bank type, cylinder head means providing a combustion chamber and an inlet port and valve for each cylinder, intake means on said head comprising a plurality of elongated intake stacks extending transversely of the engine, one for each cylinder, said stacks being of substantially similar section and the outboard ends thereof defining an inlet, each stack defining with the cylinder head means for its associated cylinder a continuous intake passage independent of those of the other cylinders and extending from the inlet port of its associated cylinder to its said outboard inlet, said intake passages each having a length providing harmonic resonant conditions therein of the order obtainable by a passage whose length in inches is approximately $$\frac{72C}{N} \pm 3$$

where N is the engine speed in revolutions per minute at which the engine power performance is to substantially peak and C is the velocity of sound in feet per second in air under the atmospheric temperature and pressure conditions at which the engine is to be operated, means for continuously supplying fuel to said intake passage at a position intermediate the said terminal points of said intake passage, separate air chambers connecting with the said outboard ends of said stacks of each bank and means for directing air to said chambers.

8. In an internal combustion engine of the multi cylinder type, cylinder head means providing a combustion chamber and an inlet port and valve for each cylinder, intake means mounted on said head comprising a plurality of elongated intake stacks extending transversely of the engine, one for each cylinder, said stacks having a conical section adjacent their outboard ends, the large end of which constitutes the outboard inlet of the stack, each stack defining with the cylinder head means for its associated cylinder a continuous intake passage independent of those of the other cylinders and extending from the inlet port of its associated cylinder to its said outboard inlet, said intake passages having a length in inches approximately $$\frac{72C}{N} \pm 3$$

where N is the engine speed in revolutions per minute at which the engine power performance is to substantially peak and C is the velocity of sound in feet per second in air under the atmospheric temperature and pressure conditions at which the engine is to be operated.

9. An engine as claimed in claim 1 wherein the outboard ends of the stacks define outwardly curving flared entrances.

10. An engine as claimed in claim 8 wherein the outboard ends of the conical sections define outwardly curving flared entrances.

11. An engine as claimed in claim 8 wherein the outboard ends of the conical sections define outwardly curving flared entrances and wherein said entrances have secured thereto in axially spaced relation a second tubular conical member having an outwardly flared entrance.

12. In an internal combustion engine having two banks of cylinders arranged in a V with the cylinders of one bank offset longitudinally of the engine relative to those of the other bank, cylinder head means on said cylinders of each bank providing a combustion chamber and an inlet port and valve for each cylinder, intake means for each bank of cylinders including an elongated body section extending longitudinally of the engine and mounted thereon adjacent the inner side of said V and an elongated tubular intake stack for each cylinder extending from said body sections transversely of the engine, the stacks for each bank of cylinders having outboard entrances and crossing each other at the longitudinally extending mid portion of said engine and nesting with each other when viewed from above the engine, said cylinder head means and intake means defining portions of a continuous intake passage for each cylinder independent of those of the other cylinders and extending from said inlet port thereof through said head means, body sections and stacks to the said outboard entrances of the latter, said intake passage having a length in inches substantially equal to $$\frac{72C}{N} \pm 3$$

where N is the engine speed in revolutions per minute at which the engine power performance is to substantially peak and C is the velocity of sound in feet per second in air under the atmospheric temperature and pressure conditions at which the engine is to be operated.

13. An engine as claimed in claim 12 wherein there is an adjustable throttle blade in each intake passage and wherein there is a fuel injection nozzle for continuously feeding fuel located in that portion of each intake passage which is defined by the intake stack and which is upstream of the throttle blade.

14. An engine as claimed in claim 12 wherein the combustion chamber is of a generally hemispherical form.

15. In combination an internal combustion engine having two banks of cylinders arranged in a V with the cylinders of one bank offset longitudinally of the engine relative to those of the other bank, cylinder head means on said cylinders of each bank providing a combustion chamber and an inlet port and valve for each cylinder, intake means for each bank of cylinders including an elongated body section extending longitudinally of the engine and mounted thereon adjacent the inner side of said V and an elongated tubular intake stack for each cylinder extending from said body sections transversely of the engine, the stacks for each bank of cylinders having outboard entrances and crossing each other at the longitudinally extending mid portion of said engine and nesting with each other when viewed from above said engine, said cylinder head means and intake means defining portions of a continuous intake passage for each cylinder extending from said inlet ports thereof through said head means, body sections and stacks to the said outboard entrances of the latter, said intake passage having a length in inches substantially equal to $$\frac{72C}{N} \pm 3$$

where N is the engine speed in revolutions per minute at which the engine power performance is to substantially peak and C is the velocity of sound in feet per second in air under the atmospheric temperature and pressure conditions at which the engine is to be operated, fuel injection nozzles located in said intake passages between the said terminal points thereof and outwardly beyond said head means for continuously discharging fuel into said intake passages, a source of fuel, distribution means mounted intermediate said cylinder banks for distribution of said fuel to said injection nozzles, supply lines connecting said nozzles and distribution means, pump means for delivering fuel to said distribution means from said source, and manually operable means for controlling the amount of fuel distributed by said distribution means to said nozzles.

16. In combination an internal combustion engine having two banks of cylinders arranged in a V with the cylinders of one bank offset longitudinally of the engine relative to those of the other bank, cylinder head means on said cylinders of each bank providing a combustion chamber and an inlet port and valve for each cylinder, intake means for each bank of cylinders including an elongated body section extending longitudinally of the engine and mounted thereon adjacent the inner side of said V and an elongated tubular intake stack for each cylinder extending from said body sections transversely of the engine, the stacks for each bank of cylinders having outboard entrances and crossing each other at the longitudinally extending mid portion of said engine and nesting with each other when viewed from above said engine, said cylinder head means and manifold means defining portions of a continuous intake passage for each cylinder extending from said inlet ports thereof through said head means, body sections and stacks to the said outboard entrances of the latter, said intake passages having a length to provide a harmonic resonant condition therein of the order obtainable by a passage whose length in inches is approximately $$\frac{72C}{N} \pm 3$$

where N is the engine speed in revolutions per minute at which the performance of the engine is to peak and C is the velocity of sound in feet per second in the intake passage under the temperature and pressure conditions expected, fuel injection nozzles located in said intake passages between the said terminal points thereof and outwardly beyond said head means for continuously discharging fuel into said intake passages, a source of solid fuel, fuel distribution means mounted intermediate said cylinder banks including a control valve and a distributing chamber, feed line means connecting each of said injection nozzles with said distributing chamber, pump means for delivering fuel to said distributing means from said source, said pump means having an intake side and a discharge side, pressure regulating valve means operably connecting said intake and discharge sides of said pump means, feed line means connecting the discharge side of said pump means with said control valve of said distribution means, a bypass valve and jet means operably connecting said last mentioned feed line means and said fuel source and manually operable means for controlling said control valve of said distribution means.

17. In an internal combustion engine of the multi cylinder type, cylinder head means providing a combustion chamber, an inlet port and valve and an inlet passage for each cylinder; intake manifold means comprising a plurality of elongated generally paralleling intake conduits one for each cylinder and connecting with the inlet passage for that cylinder, each said connected inlet passage and intake conduit defining for its cylinder a continuous intake passage independent of those of the other cylinders and having a length to provide a harmonic resonant condition therein of the order obtainable by a passage whose length in inches is approximately $$\frac{72C}{N} \pm 3$$

where N is the engine speed in R. P. M. at which the performance of the engine is to peak and C is the velocity of sound in feed per second in the intake passages under the temperature and pressure conditions expected, whereby dynamic charging is obtainable during engine operation, injection fuel discharge nozzles positioned to continuously discharge fuel into said intake conduit and throttle means for controlling the charging of the cylinders.

18. In an internal combustion engine of the multi cylinder type, cylinder head means providing a combustion chamber, an inlet port and valve and an inlet passage for each cylinder; intake manifold means comprising a plurality of elongated generally paralleling intake conduits one for each cylinder and connecting with the inlet passage for that cylinder, each said connected inlet passage and intake conduit defining for its cylinder a continuous intake passage independent of those of the other cylinders and having a length to provide a harmonic resonant condition theerin providing dynamic charging effects during engine operation, said condition being characterized by a passage whose length in inches is generally defined by the formula $$\frac{72C}{N} \pm 3$$

where N is the engine speed in R. P. M. at which the performance of the engine is to peak and C is the velocity of sound in feet per second under the atmospheric temperature and pressure conditions at which the engine is to be operated, injection fuel discharge nozzles positioned to continuously discharge fuel into said intake conduits; means for continuously feeding fuel to said nozzles and throttle means for controlling the charging of the cylinders.

References Cited in the file of this patent

UNITED STATES PATENTS

| | | |
|---|---|---|
| 1,193,021 | Johnston | Aug. 1, 1916 |
| 1,205,660 | Peterson | Nov. 21, 1916 |
| 1,597,787 | Hausser et al. | Aug. 31, 1926 |
| 1,802,848 | Summers | Apr. 28, 1931 |
| 1,834,473 | Ricardo | Dec. 1, 1931 |
| 1,977,200 | Osterberg | Oct. 16, 1934 |
| 2,119,879 | Hoffman et al. | June 7, 1938 |
| 2,136,957 | Winfield | Nov. 15, 1938 |
| 2,382,244 | Lundquist et al. | Aug. 14, 1945 |
| 2,487,436 | Goehring | Nov. 8, 1949 |
| 2,563,939 | Kishline | Aug. 14, 1951 |

FOREIGN PATENTS

| | | |
|---|---|---|
| 824,916 | France | Nov. 18, 1937 |

OTHER REFERENCES

Inertia Supercharging of Engine Cylinders, Tran. A. S. M. E., vol. 55, No. 5, 1933, page 55. Dennison; N. A. C. A. T. N. No. 935, Dynamics of the Inlet System of a Four-Stroke Engine, page 2, Boden et al.